(12) United States Patent
Karaki

(10) Patent No.: US 8,899,828 B2
(45) Date of Patent: Dec. 2, 2014

(54) HEAT SENSOR CORRECTION

(75) Inventor: Habib Sami Karaki, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 134 days.

(21) Appl. No.: 13/427,521

(22) Filed: Mar. 22, 2012

(65) Prior Publication Data
US 2013/0250998 A1 Sep. 26, 2013

(51) Int. Cl.
*G01K 7/00* (2006.01)
*G01K 3/00* (2006.01)

(52) U.S. Cl.
USPC ............. 374/179; 374/1; 374/102; 374/107; 702/99; 702/130

(58) Field of Classification Search
USPC ................ 374/179, 1, 102, 107; 702/99, 130
See application file for complete search history.

(56) References Cited

U.S. PATENT DOCUMENTS

| | | | | |
|---|---|---|---|---|
| 3,992,229 A | * | 11/1976 | Hall, Jr. | 136/227 |
| 4,456,390 A | * | 6/1984 | Junkert et al. | 374/128 |
| 4,456,919 A | * | 6/1984 | Tomita et al. | 374/132 |
| 4,722,612 A | * | 2/1988 | Junkert et al. | 374/124 |
| 6,545,334 B2 | * | 4/2003 | Verhaegen | 257/467 |
| 6,964,515 B2 | * | 11/2005 | Asakura et al. | 374/133 |
| 7,410,290 B2 | * | 8/2008 | Tanaka | 374/121 |
| 7,891,767 B2 | * | 2/2011 | Silverbrook | 347/42 |
| 2002/0037026 A1 | * | 3/2002 | Sato et al. | 374/132 |
| 2005/0034749 A1 | * | 2/2005 | Chen et al. | 136/224 |
| 2005/0081905 A1 | * | 4/2005 | Lan et al. | 136/224 |
| 2006/0153273 A1 | * | 7/2006 | Torii et al. | 374/121 |
| 2008/0317087 A1 | * | 12/2008 | Kimura | 374/1 |
| 2009/0024348 A1 | | 1/2009 | Schuh et al. | |

FOREIGN PATENT DOCUMENTS

| | | |
|---|---|---|
| JP | 06129914 | 5/1994 |
| JP | 2004037139 | 2/2004 |
| JP | 2011128067 | 6/2011 |
| KR | 1020090071905 | 7/2009 |

OTHER PUBLICATIONS

Translation of JP 2004-037139 to Ikuo et al (May 2, 2004).*
PCT Search Report mailed Jun. 26, 2013.

* cited by examiner

*Primary Examiner* — Mirellys Jagan
(74) *Attorney, Agent, or Firm* — Alan A. R. Cooper; Frederick J. Telecky, Jr.

(57) ABSTRACT

A heat sensor has the ability to correct for errors introduced during temperature changes of the hot junction of the thermopile for the heat sensor. For example, the effect of temperature changes at the hot junction of the heat sensor relative to the cold junction is mathematically modeled such that the effect on the temperature determination can be corrected given certain information relating to the thermopile, its electrical output, and the temperature history and current temperature of the cold junction. By accounting for these factors, a processing device can modify the temperature determination output for the heat sensor while correcting for error introduced by temperature changes at the hot junction as determined by the mathematical model.

15 Claims, 6 Drawing Sheets

HEAT SENSOR CORRECTION

TECHNICAL FIELD

This invention relates generally to heat sensors, and more specifically to correcting heat sensor temperature determinations to account for errors introduced from outside influences.

BACKGROUND

Electronic devices of various kinds are well known. Moreover, each of these electronic devices includes elements that tend to heat up with use over time. For example, computing devices include processor circuits that will heat up over time and with increased use of the processing device as a result of the amount of current that flows through a circuit during its operation. The heating of the processing device is a known artifact in the computing world. For example, certain computing devices such as large desktop computers include temperature protection mechanisms such that the processing device or other components of the system do not overheat and break down.

Accordingly, in certain applications, temperature sensors are incorporated into computing devices to sense the temperature of certain components that are susceptible to break down or failure as a result of overheating. For example, an infrared heat detector can be disposed to collect infrared energy given off by a heated portion of the device. The infrared sensor collects that infrared radiation and converts it into a voltage from which a computing device can determine the temperature of the material from which the heat sensor is collecting infrared radiation. In one example, a heat sensor includes a thermopile or a component whose electrical properties (such as voltage) change when the temperature gradient across the component changes. So configured, one end of the thermopile is configured to be heated by the infrared radiation received from the material of which the temperature is to be sensed. This side is called a "hot junction" of the thermopile. The other side of the thermopile is called a "cold junction" and is kept at a relatively stable temperature such that changes in temperature of the first side of the thermopile or "hot junction" will result in a change in the electrical properties of the thermopile that can be tracked and correlated to temperature of the target material.

It is known, however, that during a thermopile's hot junction temperature change, the temperature determination of the target material will be inaccurate. This is because part of the heat flow on the thermopile's hot junction is used to change the temperature of the hot junction rather than generate the signal. Once the temperature is stable then this error disappears. The major source of temperature change of the hot junction in an infrared sensor is through heat transfer to and from the cold junction. As a result, infrared sensors designed to be placed into computing devices, for example, are designed such that sensor itself or at least the cold junction is as thermally isolated from the remaining system and computing device as possible so as to reduce temperature changes that could result in temperature sensing errors. By configuring the infrared sensor in this manner, the infrared sensor itself has a relatively bulky size and takes up a relatively large amount of space which can be detrimental when implemented in a computer or other mobile electronic device or size and portability device can be a high priority or concern. Moreover, thermal isolation only partially mitigates the errors introduced during temperature variations because the thermal isolation is not perfect.

SUMMARY

Generally speaking and pursuant to these various embodiments, a heat sensor having the ability to correct for errors introduced during temperature changes of the thermopile for the heat sensor will be described. By one approach, the effect of temperature changes at the hot junction of the heat sensor relative to the cold junction is mathematically modeled such that the effect on the output comprising the determination of temperature of the target material can be corrected given certain information relating to the thermopile's physical properties, the thermopile's electrical output, and the temperature history and current temperature of the cold junction. By accounting for these factors, a processing device can modify the temperature determination output for the heat sensor while correcting for error introduced by temperature changes as determined by the mathematical model. So configured, not only is the temperature determination more accurate, but the sensor itself no longer needs to be as thermally isolated from the remaining surrounding area or computing device as in previous infrared sensor approaches. As a result, the infrared sensor package itself can be largely reduced in size to take up a smaller footprint of the computing device and potentially have more flexibility with respect to placement relative to a target material whose temperature should be monitored to avoid failure. These and other benefits may become clear upon making a thorough review and study of the following detailed description.

BRIEF DESCRIPTION OF THE DRAWINGS

The above needs are at least partially met through provision of the heat sensor error correction described in the following detailed description and particularly when studied in conjunction with the drawings wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set

DETAILED DESCRIPTION

Figure 1:
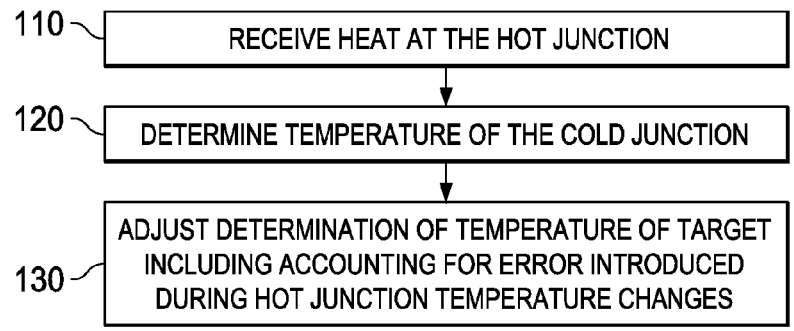
FIG. 1 comprises a flow chart for an example method of operation for a heat sensor as configured in accordance with various embodiments of the invention.

Referring now to the drawings, and in particular to FIG. 1, an illustrative process that is compatible with many of these teachings will now be presented. The method of FIG. 1 includes receiving 100 heat at a hot junction of heat sensor to determine a temperature of a portion of a device. For example, the device portion whose temperature is being monitored emits infrared radiation that is received by a material of the heat sensor. The material of the heat sensor heats up, and in this manner, the hot junction receives heat from the device portion for which a temperature determination is made. The method further includes determining 120 a temperature of a cold junction of the heat sensor. For example, a separate temperature sensor may be disposed next to the cold junction, or in another approach, the cold junction may be thermally sinked to a larger portion of the device on which a separate temperature sensor is disposed. The method includes adjusting 130 with the processor device a determination of the temperature of the portion of the device in response to receiving the heat at the hot junction of the first heat sensor. The adjusting includes accounting for error introduced during temperature changes of the hot junction of the heat sensor.

The accounting for error introduced during temperature changes at the hot junction can be accomplished in a number of ways. By one approach, the accounting for error introduced during temperature changes of the hot junction of the heat sensor includes adjusting an output of the heat sensor corresponding to temperatures of the hot junction and the cold junction by an amount depending at least in part on a constant that accounts for material properties and a model of heat transferred between the cold junction and the hot junction and a determination of change of temperature of the cold junction over time. By another approach, the adjusting the output of the heat sensor includes an amount depending at least in part on a determination of change of potential between the cold junction and the hot junction over time.

By one example, the error introduced by transient temperatures at the hot junction of the heat sensor can be modeled as a first order RC filter that delays temperature changes of the hot junction relative to the cold junction temperature. In this RC filter model, the thermal resistance of the thermopile between the cold junction and the hot junction of the heat sensor represents resistive term of the RC filter. Thermal capacitance of the thermopile's hot junction represents the capacitive term of the RC filter model. So configured, the RC filter model can be mathematically expressed according to the following equation:

$$C_{th}\frac{\partial T_{Hot}}{\partial t} + \frac{T_{Hot} - T_{Cold}}{R_{th}} + \frac{S \times (T_{Hot}^4 - T_{Object}^4)}{\text{Seebeck} \times R_{th}} = 0$$

where "$C_{th}$" is the thermal capacitance of the thermopile, "$T_{Hot}$" is the temperature of the hot junction, "$T_{Cold}$" is the temperature of the cold junction, "$S \times (T^4_{Hot} - T^4_{Object})$" is related to the infrared heat transfer to the hot junction from the object whose temperature is being sensed, "Seebeck" is a constant coefficient that accounts for material properties of the thermopile, and "$R_{th}$" is the thermal resistivity of the thermopile.

In solving the equation for the temperature difference between the hot junction and the cold junction when the cold junction temperature is changing, the result can be used to predict the change of the temperature determination as a result of the changing temperature of the cold junction.

$$T_{Hot} - T_{Cold} = -R_{th}C_{th}\frac{\partial T_{Hot}}{\partial t} - \frac{S \times (T_{Hot}^4 - T_{Object}^4)}{\text{Seebeck}}$$

In an ideal thermally isolated sensor, as heat from the device portion is collected by the heat sensor and warms the hot junction, the voltage across the thermopile also changes according to the equation: $V_{Obj} = S \times (T_{Object}^4 - T_{Hot}^4)$. This portion can be separated from the other factors mathematically whereby the other portions of the above equation then amount to the portion of the voltage change caused by factors other than heat from the sensed portion, which thereby represents the error in the temperature determination. This mathematical process can be represented as follows:

$$T_{Hot} - T_{Cold} = -R_{th}C_{th}\frac{\partial T_{Hot}}{\partial t} + \frac{V_{Obj}}{\text{Seebeck}} \Leftrightarrow \text{Seebeck} \times (T_{Hot} - T_{Cold}) =$$

$$-\text{Seebeck} \times R_{th}C_{th}\frac{\partial T_{Hot}}{\partial t} + V_{Obj} \Leftrightarrow V_{Out} = \text{Seebeck} \times (T_{Hot} - T_{Cold}) =$$

$$V_{Err} + V_{Obj} \Leftrightarrow V_{Err} = -\text{Seebeck} \times R_{th}C_{th}\frac{\partial T_{Hot}}{\partial t}$$

The error voltage is represented in the following equation as $V_{Err}$ and is dependent on the relatively constant term Seebeck×$R_{th}C_{th}$ and the change of the temperature of the hot junction over time. Because the cold junction temperature can be separately and accurately monitored with a separate temperature sensor and the voltage across the thermopile is accurately known, it is advantageous to rewrite the error equation in terms of the cold junction temperature and voltage out as follows:

$$\text{Seebeck} \times (T_{Hot} - T_{Cold}) =$$

$$V_{Out} \Leftrightarrow \text{Seebeck} \times \left(\frac{\partial T_{Hot}}{\partial t} - \frac{\partial T_{Cold}}{\partial t}\right) = \frac{\partial V_{Out}}{\partial t} \Leftrightarrow \frac{\partial T_{Hot}}{\partial t} =$$

$$\frac{\partial T_{Cold}}{\partial t} + \frac{1}{\text{Seebeck}} \times \frac{\partial V_{Out}}{\partial t} \Leftrightarrow -\text{Seebeck} \times R_{th}C_{th}\frac{\partial T_{Hot}}{\partial t} =$$

$$-\text{Seebeck} \times R_{th}C_{th}\frac{\partial T_{Cold}}{\partial t} - R_{th}C_{th} \times \frac{\partial V_{Out}}{\partial t} \Leftrightarrow V_{Err} =$$

$$-\text{Seebeck} \times R_{th}C_{th}\frac{\partial T_{Cold}}{\partial t} - R_{th}C_{th} \times \frac{\partial V_{Out}}{\partial t}$$

Per this model, the voltage error is dependent on known constants and the change in cold junction temperature over time and the voltage out over time. By use of this model of heat transferred between the cold junction and the hot junction, the accounting for error introduced during temperature changes of the cold junction of the heat sensor includes adjusting an output of the heat sensor according to the temperature of the cold junction by an amount depending at least in part on a constant that accounts for material properties (Seebeck×$R_{th}C_{th}$) and a determination of change of temperature of the cold junction over time ($dT_{Cold}/dt$). The term relating to the change of voltage out over time ($dV_{Out}/dt$) is small relative to the cold junction temperature over time and can be ignored in some applications; this term, however, is more significant with more sensitive heat sensors.

Various methods can be used to account for the change in temperature of the cold junction over time. By one approach, making the determination of change of temperature of the cold junction over time is accomplished by determining an estimated straight line fit of the change of temperature of the cold junction over time relative to a set of recorded temperatures of the cold junction over time. In this approach, the method of FIG. 1 includes recording the temperature of the cold junction at regular intervals over time and mathematically determining a fit of a line through the time of changing cold junction temperatures to determine the $dT_{Cold}/dt$ element.

In another approach, making the determination of change of temperature of the cold junction over time by applying a filter to stored temperatures of the cold junction over time. In this approach, the method may further include determining a heat transfer value as part of the determination of change of temperature of the cold junction over time by applying a function based at least in part on the current temperature of the cold junction, a previous temperature of the cold junction, and a previous determination of the heat transfer value. In one example, the temperature of the cold junction can be characterized as a voltage signal with an applied RC filter. In this example, $$\frac{\partial V_{Filtered}}{\partial t} = \frac{V - V_{Filtered}}{RC}.$$

$V_{Filtered}$ over time is approximately the voltage V over time where the highest frequency component of V is much less than the inverse of the RC constant for the filter. In other words, because V is much slower than the RC time constant, its slope or derivative does not significantly change during the filter's delay. Thus, the slope of the filter's output can be assumed to be about the same as the input's. Thus the voltage term can be expressed as:

$$\frac{\partial V}{\partial t} \cong \frac{V - V_{Filtered}}{RC}.$$

If the filter is expressed as a Laplace circuit equivalent, the voltage out can be expressed as follows:

$$\frac{V_{Filtered}(s) - V(s)}{R} + sCV_{Filtered}(s) \Leftrightarrow V_{Filtered}(s) = V(s)\left(\frac{1}{1 + sRC}\right).$$

At this point, the signal is digitized by converting it to a z-transorm (frequency) domain using the known bilinear transform to reach the following expression:

$$V_{Filtered}(z) = V(z)\left(\frac{1}{1 + \left(\frac{2}{\Delta t} \times \frac{1 - z^{-1}}{1 + z^{-1}}\right)RC}\right)$$

$$= V(z)\left(\frac{\Delta t(1 + z^{-1})}{\Delta t(1 + z^{-1}) + 2(1 - z^{-1})RC}\right).$$

A first order digital filter on the signal can be expressed as:

$$V(z)\frac{1 + z^{-1}}{\left(1 + \frac{2RC}{\Delta t}\right) + \left(1 - \frac{2RC}{\Delta t}\right)z^{-1}}.$$

So configured, the voltage out term based on a number of samples "n" can be expressed as:

$$V_{Filtered}[n] = \left(\frac{1}{1 + \frac{2RC}{\Delta t}}\right)(V[n] + V[n-1]) + \left(\frac{1 - \frac{2RC}{\Delta t}}{1 + \frac{2RC}{\Delta t}}\right)V_{Filtered}[n-1].$$

Because of the assumption above regarding $V_{Filtered}$ over time being approximately V over time, the following analysis can be used to estimate the voltage error signal:

$$\frac{\partial V_{In}}{\partial t} \cong \frac{V_{In} - V_{Out}}{RC} \cong \frac{V_{In}[n] - V_{Out}[n]}{RC} \Leftrightarrow$$

$$\frac{\partial T_{Hot}}{\partial t} \cong \frac{\partial T_{Cold}}{\partial t} \cong \frac{T_{Cold}[n] - T_{Cold\_Filtered}[n]}{RC}$$

$$T_{Cold\_Filtered}[n] = a \times (T_{Cold}[n] + T_{Cold}[n-1]) + b \times T_{Cold\_Filtered}[n-1]$$

$$V_{Err} = -\text{Seebeck} \times R_{th}C_{th}\frac{T_{Cold}[n] - T_{Cold\_Filtered}[n]}{RC} =$$

$$-\alpha \times (T_{Cold}[n] - T_{Cold\_Filtered}[n])$$

In this series of equations, $T_{Cold}$ is the temperature of the cold junction. $T_{Cold\_Filtered}$ is the output of the digital filter, which is shown to depend on the current cold junction temperature $T_{Cold}[n]$, a previous cold junction temperature $T_{Cold}[n-1]$, and a previous determination of the digital filter output $T_{Cold\_Filtered}[n-1]$. "RC" is the RC term of the RC digital filter model applied to the cold junction temperature signal being measured; therefore, $\alpha$ is a relatively constant value that combines the digital filter's RC term as well as the $R_{th}C_{th}$, and Seebeck terms.

So configured, the method can account for errors introduced during temperature changes of the hot junction by mathematically calculating the derivatives of the cold junction temperature and the thermopile's voltage output. The same math can be used to calculate the derivative of the thermopile's voltage output. This math requires a previous digital filter output value, a current filter input value, and a previous filter input value. The filter's input can be the cold junction temperature or the thermopile's voltage output. This configuration reduces processor time and requires only three additional tracked values: the previous filter's input and the current and the previous filter's output value. Moreover, this approach is scalable to include any number of samples for the filter delay. For instance, an RC delay averaging the last ten samples can be applies while tracking only one previous measurement. Both this model and the linear fit model described above can be implemented in software or hardware, thereby eliminating the need to thermally isolate the sensor as done in previous infrared heat sensor applications.

Those skilled in the art will appreciate that the above-described processes are readily enabled using any of a wide variety of available and/or readily configured platforms, including partially or wholly programmable platforms as are known in the art or dedicated purpose platforms as may be desired for some applications. In an additional alternative approach, the functionality or logic described above may be embodied in the form of code that may be executed in a processor circuit. If embodied in software, each block or task may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Figure 2:
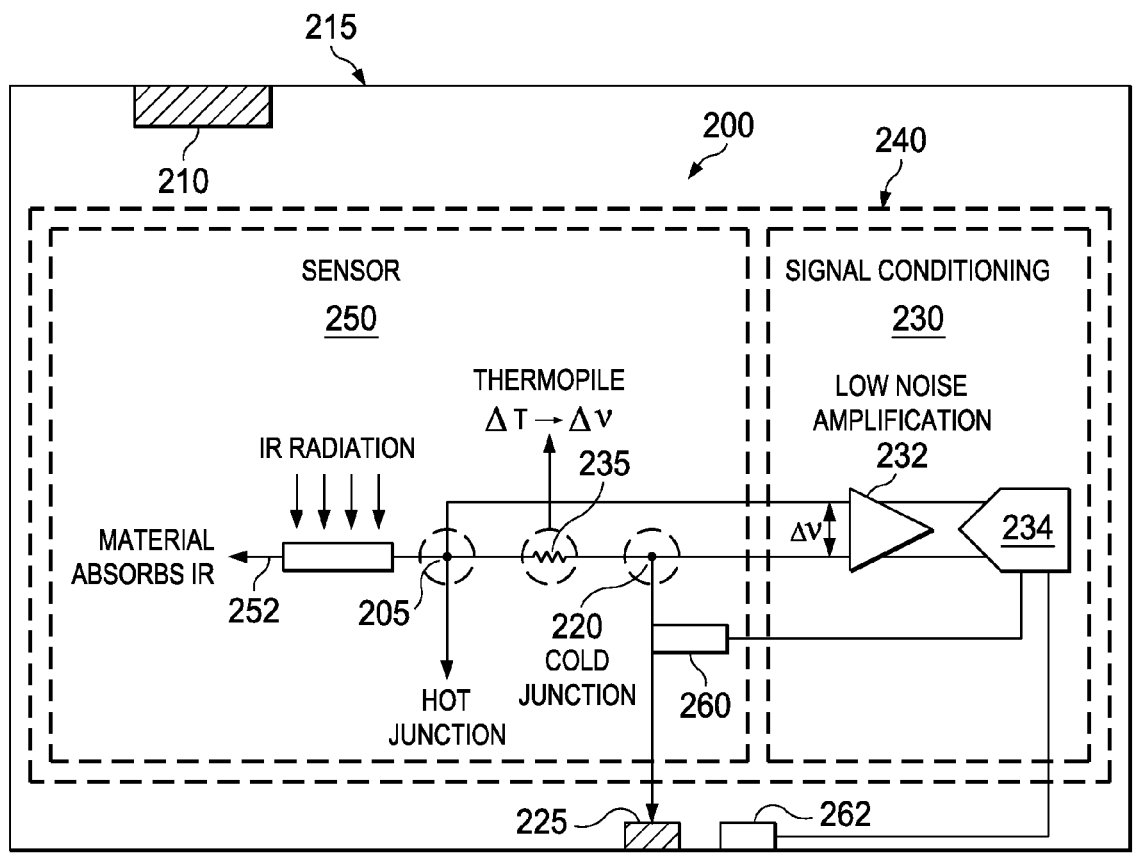
FIG. 2 comprises a block diagram of an example approaches to a heat sensor as configured in accordance with various embodiments of the invention.

Referring to FIG. 2, an example apparatus configured to execute the methods described above will now be described. The example heat sensor apparatus 200 includes a hot junction 205 configured to receive heat from a target material 210. The target material 210 is typically a portion of the larger device 215 that is heat sensitive such as a core processing device or circuit that heats up when operating, and if the target material reaches a certain critical temperature, damage to the system may occur. The heat sensor apparatus 200 further includes a cold junction 220 configured to be thermally shorted to a base material 225. The base material 225 may be a die or other support structure for the larger device 215, although other support structures are possible. The processor device 230 is in electrical communication with the hot junction 205 and the cold junction 220. The processor device 230 is configured to determine the temperature of the target material 210 based on a change in the electrical property of a thermopile 235 between the hot junction 205 and the cold junction 220. The temperature determination is made in response to receiving heat from the target material 210 including an adjustment to account for error introduced during temperature changes of the cold junction 220.

In the example of FIG. 2, the processor device 230 includes a low noise amplifier 232 electrically connected to the hot junction 205 and the cold junction 220. The low noise amplifier 232 amplifies the voltage signal across the thermopile 235 and provides that output to a processing element or circuit 234. Those skilled in the art will recognize that other configurations of the processor device 230 are possible and that such a processor can comprise a fixed purpose hard wired platform or can comprise a partially or wholly programmable platform. All of these architectural options are well known and understood in the art and require no further description here. In any event, the processor device 230 is configured as known to those skilled in the art to execute the methods described above with respect to FIG. 1.

By one approach, the heat sensor apparatus can comprise a single chip or package as represented by box 240. In this example, the material 252 that absorbs the infrared radiation from the target material 210, the thermopile 235 complete with the hot junction 205 and cold junction 220, and the processor device 230 is included in a single package. In other approaches, the heat sensor may comprise a separate element 250 that includes the material 252 that absorbs the infrared radiation, the thermopile 235, the hot junction 205, and the cold junction 220. In this approach, the heat sensor 250 is mounted to the die or other support structure 225 and provides its signals to a separate processor device 230, such as a processing device for the device 215. More specifically, the voltage signal across the thermopile 235 can be transferred via electrical connection to a separate device or circuit that acts as the processor device 230. In either approach, the processor device 230 may include a further electrical connection to a heat sensor configured to determine the temperature of the die or support structure to which the cold junction 220 is thermally sinked. The temperature sensor may comprise a temperature sensor 260 disposed within the infrared sensor 250. By another approach, the second temperature sensor 262 may be disposed separately on the die or support material 225 on which the heat sensor 250 is mounted.

By another approach, the apparatus configured to execute a method as described above can include a host device 215, a first heat sensor 250 disposed in the host device 215 to sense a temperature of a first portion 210 of the host device 215, a second heat sensor 260 or 262 configured to determine a temperature of the second portion 225 of the host device 215, and a processor device 230 in communication with the heat sensor 250 and the second heat sensor 260 or 262. The first heat sensor 250 of this example includes a cold junction 220 thermally shorted to the second portion 225 of the host device 215. The hot junction 205 is configured to receive heat from the first portion 210 of the host device 215 via material 252 that absorbs the infrared radiation. The processor device 230 is configured to error correct a determination of the temperature of the first portion 210 of the host device 215 based on signals of the heat sensor 250 by accounting for error introduced during temperature changes at the second portion 225 of the host device 215. In this context, the processor device 230 can apply the same methods as described above to correct temperature determinations by the heat sensor 250 to account for the temperature changes of the cold junction 220, which is thermally sinked to the second portion 225 of the host device 215. So configured, a more accurate reading of temperature of the first portion 210 of the host device 215 is possible without thermally isolating the cold junction 220 of the infrared heat sensor 250.

Figure 3:
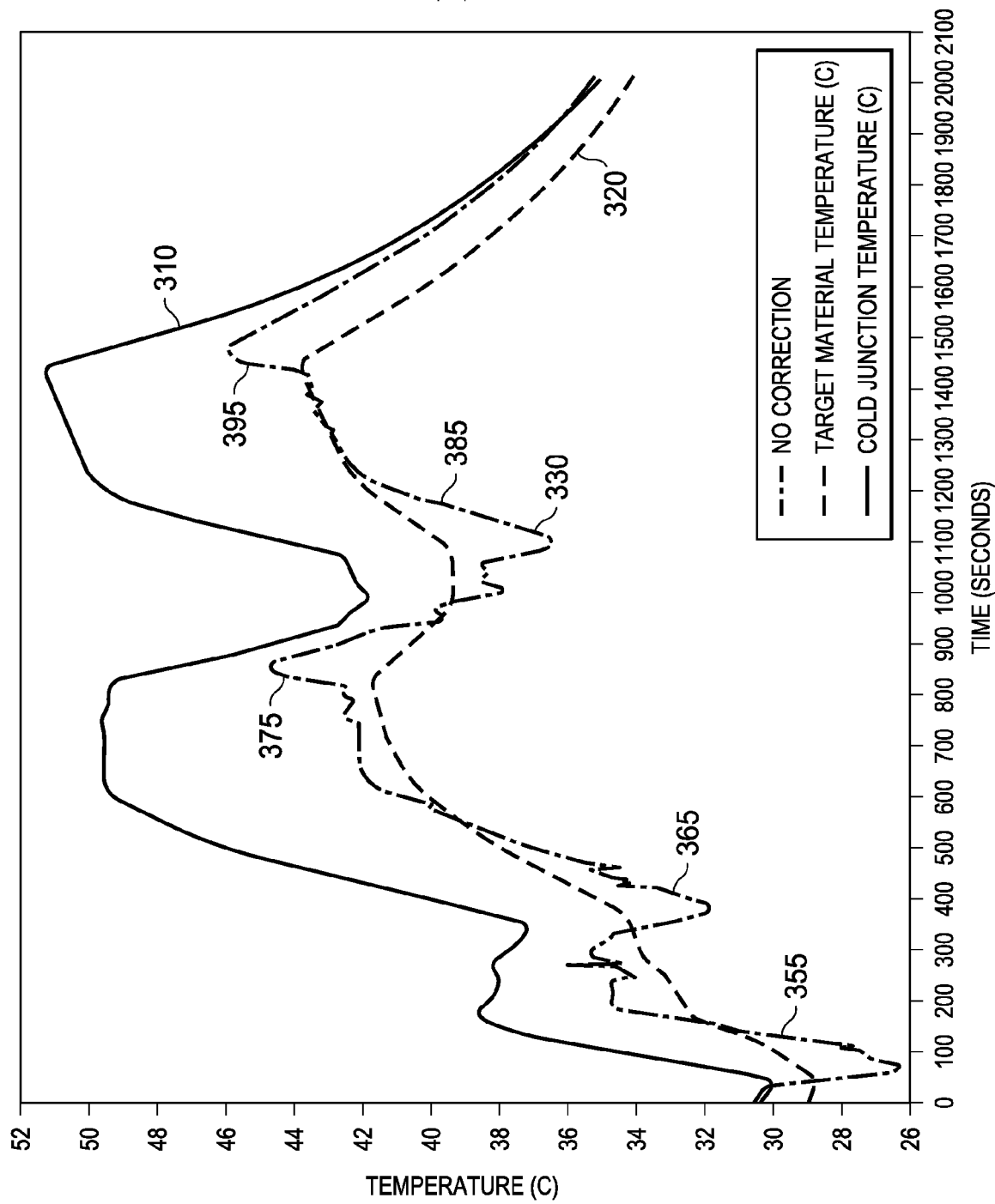
FIGS. 3-6 comprise graphs of temperature over time including actual, sensed, and corrected temperature determinations in accordance with various embodiments of the invention.

The performance of one example desktop experiment application of this technology performed by the inventors will be explained further with reference to FIGS. 3-7. FIG. 3 illustrates a graph of temperature over time. The line 310 shows the actual cold junction temperature in comparison to the actual temperature of the target material (line 320) whose temperature is being sensed by the infrared heat sensor and the heat sensor's temperature determination (line 330) without the error correction described in this disclosure. This graph demonstrates the deviation of the temperature sensor output from the actual target material temperature during the times where the cold junction temperature is changes, for example, at portions 355, 365, 375, 385, and 395 of the heat sensor output line 330. Additional error in the temperature determination can be explained through other known error causes not addressed by this disclosure.

Figure 4:
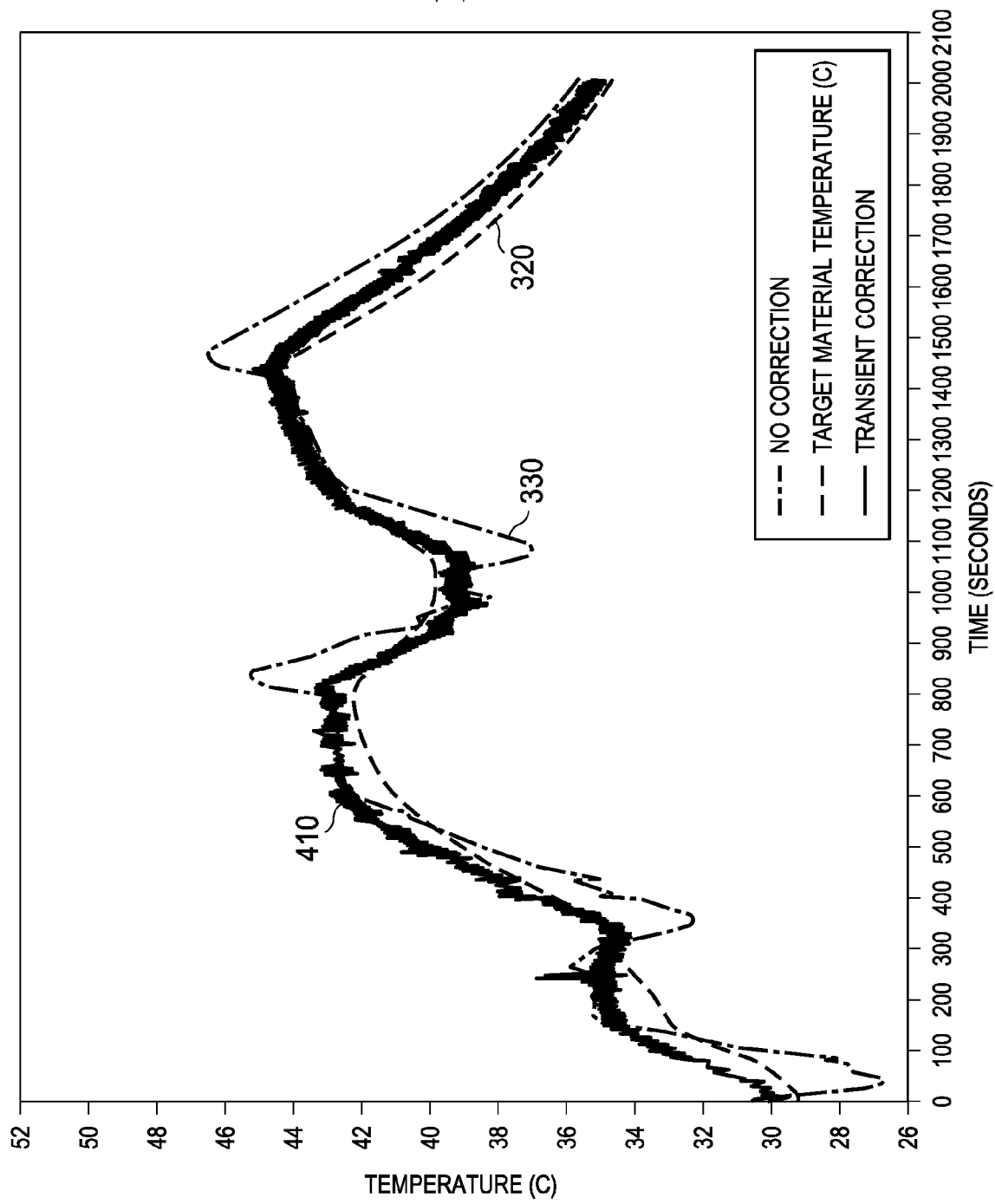

In FIG. 4, a new line 410 represents the heat sensor output with a transient correction applied, such as the straight line fit approach described above, as compared to the actual target material temperature of line 320 and the uncorrected heat sensor output of line 330. This graph demonstrates that the extreme peaks of the uncorrected temperature outputs of the heat sensor during temperature changes of the cold junction are largely eliminated although there is some high frequency noise associated with the output.

Figure 5:
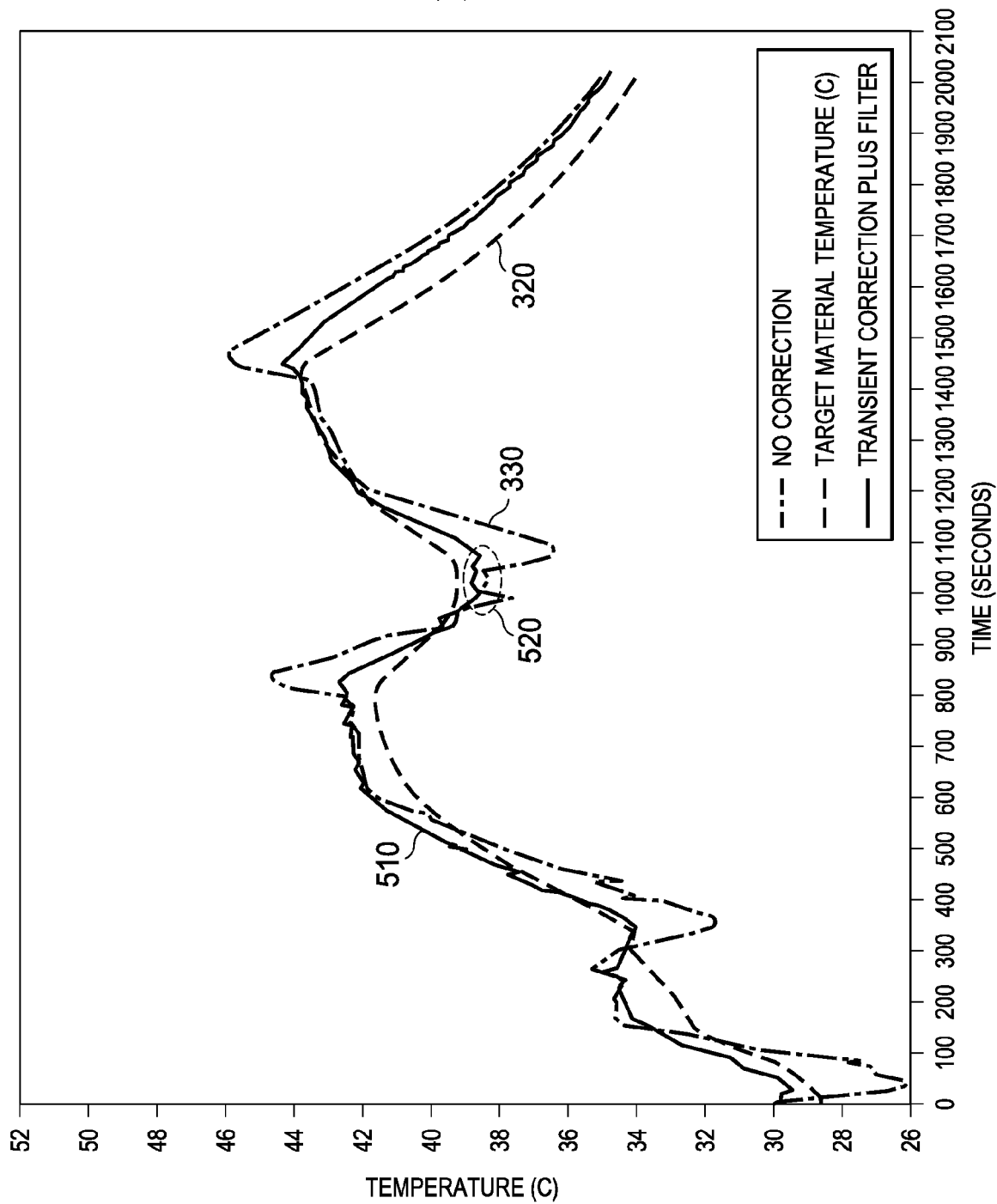

FIG. 5 illustrates with line 510 the corrected heat sensor temperature output with a filter applied to the signal, such as the digital filter described above. Much of the high frequency noise is thus reduced with the application of the filter although small scale additional ripples are seen in portions of the data such as at line portion 510.

Figure 6:
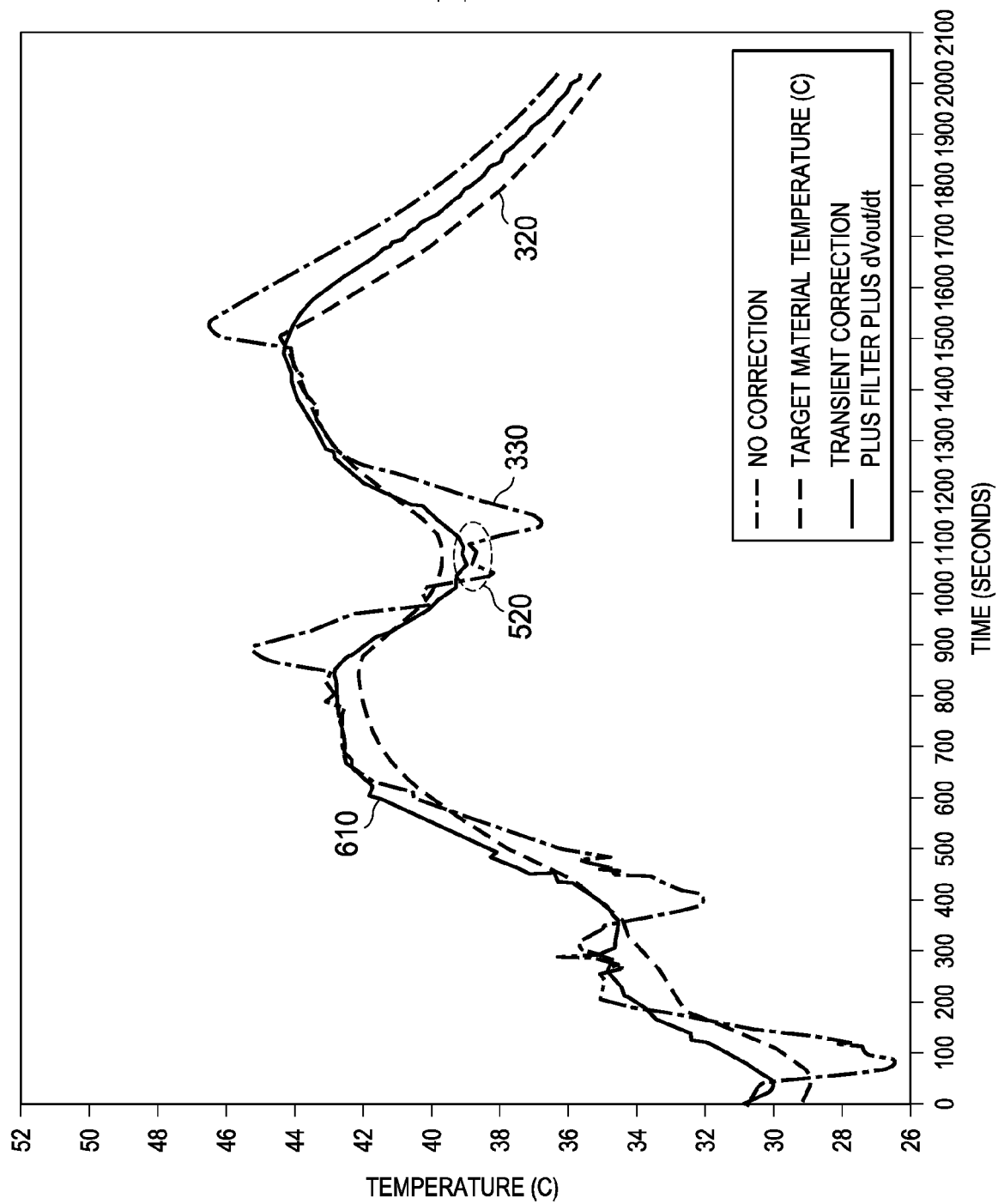

FIG. 6 illustrates with line 610 the corrected heat sensor temperature output with a filter applied to the signal together with inclusion of the term relating to the change of voltage out over time ($dV_{Out}/dt$), which was removed because of its magnitude relative to other terms of the model described above. When including this term in the illustrated example correction, additional variation of the output signal is reduced such as at the line portion 520 shown in FIG. 5.

Figure 7:
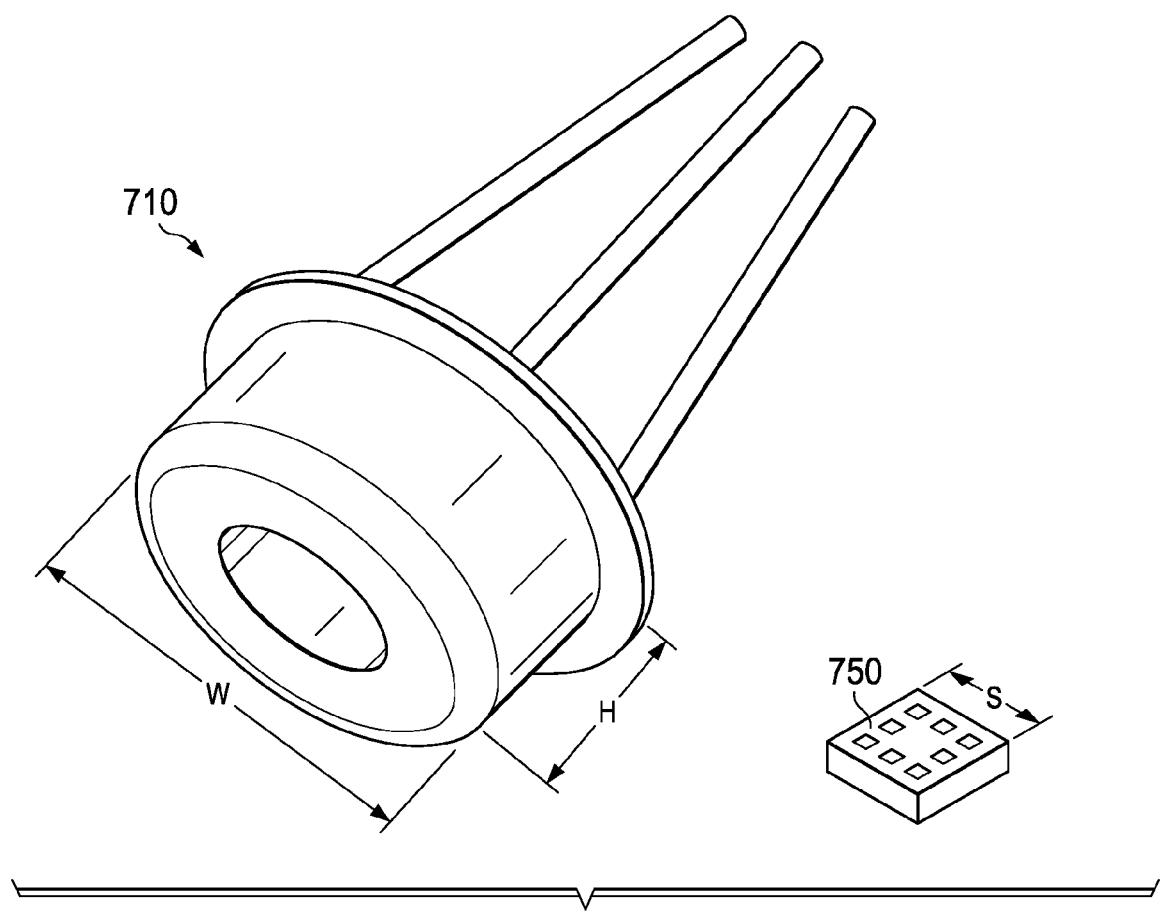
FIG. 7 comprises a diagram showing a physical comparison of a prior art infrared sensor to an example infrared sensor manufactured in accordance with various embodiments of the invention.

So configured, the models described herein provide flexibility to the builder of a heat sensor disposed to sense temperature of, for example, a computing device. The filters can be tailored to fit an acceptable lag in temperature determination, for instance between 4 and 7 seconds or less for some applications. Moreover, the size of the heat sensor can be reduced to save space in the computing device where the heat sensor is mounted. For instance, FIG. 7 illustrates a previous heat sensor device 710 having a diameter width W of about 9.1 millimeters and a height H of about 4.1 millimeters. By comparison, a heat sensor device 750 designed in accordance with various teachings of this disclosure has an approximately square size of side S of about 1.5 millimeters and a height of about 0.6 millimeters. This difference in size can be significant in the electronics area where circuit board space can be at a premium, especially for consumer devices that are becoming increasingly smaller over time.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A heat sensor apparatus comprising:
    a hot junction configured to receive heat from a target material;
    a cold junction configured to be thermally shorted to a base material;
    a processor device in electrical communication with the hot junction and the cold junction, the processor device configured to determine the temperature of the target material based on a change in electrical property of a thermopile between the hot junction and the cold junction in response to receiving heat from the target material including an adjustment to account for error introduced during temperature changes of the hot junction,
    wherein the processor device is configured to account for error introduced during temperature changes of the hot junction by adjusting the determination of the temperature by an amount depending at least in part on:
    a constant that accounts for material properties of the base material and a model of heat transfer between the cold junction and the hot junction, and
    a determination of change of temperature of the cold junction over time.

2. The apparatus of claim 1 wherein the processor device is configured to account for error introduced during temperature changes of the hot junction by adjusting the determination of the temperature by an amount depending at least in part on:
    a determination of change of potential between the cold junction and the hot junction over time.

3. The apparatus of claim 1 wherein the processor device is configured to make the determination of change of temperature of the cold junction over time by determining an estimated straight line fit of the change of temperature of the cold junction over time relative to a set of recorded temperatures of the cold junction over time.

4. The apparatus of claim 1 wherein the processor device is configured to make the determination of change of temperature of the cold junction over time by applying a filter to stored temperatures of the cold junction over time.

5. The apparatus of claim 4 wherein the processor device is configured to determine the filter's output as part of the determination of change of temperature of the cold junction over time by applying a function based at least in part on the current temperature of the cold junction, a previous temperature of the cold junction, and a previous determination of the filter's output.

6. An apparatus comprising:
    a host device;
    a first heat sensor disposed in the host device to sense a temperature of a first portion of the host device, the first heat sensor including:
        a cold junction thermally shorted to a second portion of the host device, and
        a hot junction configured to receive heat from the first portion of the host device; and
        a second heat sensor configured to determine a temperature of the second portion of the host device;
    a processor device in communication with the heat sensor and the second heat sensor, the processor device configured to error correct a determination of the temperature of the first portion of the host device based on signals of the heat sensor by accounting for error introduced during temperature changes at the second portion of the host device,
    wherein the processor device is configured to account for error introduced during temperature changes at the second portion of the host device by adjusting an output of the first heat sensor corresponding to the temperature of the first portion of the heat device by an amount depending at least in part on:
    a constant that accounts for target material properties of the base material and a model of heat transfer between the cold junction and the hot junction of the first heat sensor, and
    a determination of change of temperature of the cold junction over time.

7. The apparatus of claim 6 wherein the processor device is configured to account for error introduced during temperature changes at the second portion of the host device by adjusting an output of the first heat sensor corresponding to the temperature of the first portion of the heat device by an amount depending at least in part on:
    a determination of change of potential between the cold junction and the hot junction over time.

8. The apparatus of claim 6 wherein the processor device is configured to make the determination of change of temperature of the cold junction over time by determining an estimated straight line fit of the change of temperature of the cold junction over time relative to a set of recorded temperatures of the cold junction over time.

9. The apparatus of claim 6 wherein the processor device is configured to make the determination of change of temperature of the cold junction over time by applying a filter to stored temperatures of the cold junction over time.

10. The apparatus of claim 9 wherein the processor device is configured to determine the filter's output as part of the determination of change of temperature of the cold junction over time by applying a function based at least in part on the current temperature of the cold junction, a previous temperature of the cold junction, and a previous determination of the filter's output.

11. A method comprising:
    receiving heat at hot junction of a heat sensor to determine a temperature of a portion of a device;
    determining a temperature of a cold junction of the heat sensor;

adjusting with a processor device a determination of the temperature of the portion of the device in response to receiving the heat at the hot junction of the heat sensor, the adjusting including accounting for error introduced during temperature changes of the hot junction of the heat sensor, wherein the accounting for error introduced during temperature changes of the hot junction of the heat sensor comprises adjusting an output of the heat sensor corresponding to temperatures of the hot junction and the cold junction by an amount depending at least in part on:

a constant that accounts for material properties of the base material and a model of heat transfer between the cold junction and the hot junction portion of the heat sensor, and a determination of change of temperature of the cold junction over time.

12. The method of claim 11 wherein the accounting for error introduced during temperature changes of the hot junction of the heat sensor comprises adjusting an output of the heat sensor corresponding to temperatures of the hot junction and the cold junction by an amount depending at least in part on:

a determination of change of potential between the cold junction and the hot junction over time.

13. The method of claim 11 further comprising making the determination of change of temperature of the cold junction over time by determining an estimated straight line fit of the change of temperature of the cold junction over time relative to a set of recorded temperatures of the cold junction over time.

14. The method of claim 11 further comprising making the determination of change of temperature of the cold junction over time by applying a filter to stored temperatures of the cold junction over time.

15. The method of claim 14 further comprising determining the filter's output as part of the determination of change of temperature of the cold junction over time by applying a function based at least in part on the current temperature of the cold junction, a previous temperature of the cold junction, and a previous determination of filter's output.

* * * * *